2 Sheets—Sheet 1.

J. BOWEN.
Cider-Mill.

No. 8,441. Reissued Oct. 1, 1878.

WITNESSES

W. L. Curaud

J. J. McCarthy.

By

INVENTOR

Jesse Bowen

Attorneys

N. PETERS, PHOTO-LITHOGRAPHER, WASHINGTON, D. C.

J. BOWEN.
Cider-Mill.

No. 8,441. Reissued Oct. 1, 1878.

WITNESSES
Franck L. Durand
J. J. Murthy

By

INVENTOR
Jesse Bowen
Alexander & Mason
Attorneys

N. PETERS, PHOTO-LITHOGRAPHER, WASHINGTON, D. C.

UNITED STATES PATENT OFFICE.

JESSE BOWEN, OF LANCASTER, OHIO.

IMPROVEMENT IN CIDER-MILLS.

Specification forming part of Letters Patent No. 166,251, dated August 3, 1875; Reissue No. 8,441, dated October 1, 1878; application filed August 15, 1878.

*To all whom it may concern:*

Be it known that I, JESSE BOWEN, of Lancaster, in the county of Fairfield and State of Ohio, have invented certain new and useful Improvements in Cider-Mills; and I do hereby declare that the following is a full, clear, and exact description thereof, reference being had to the accompanying drawings, and to the letters of reference marked thereon, which form a part of this specification.

My invention relates to a class of cider-mills known as "hand-presses;" and consists, in the first part, of a rasping-cylinder, so formed that it will readily clear itself of pomace.

My invention consists, in the second part, in connection with an annular groove in the false bottom of the press, of a perforated metallic conical sieve, whose object is to collect and discharge the juices formed in the center of the pomace.

Figures 1, 2:
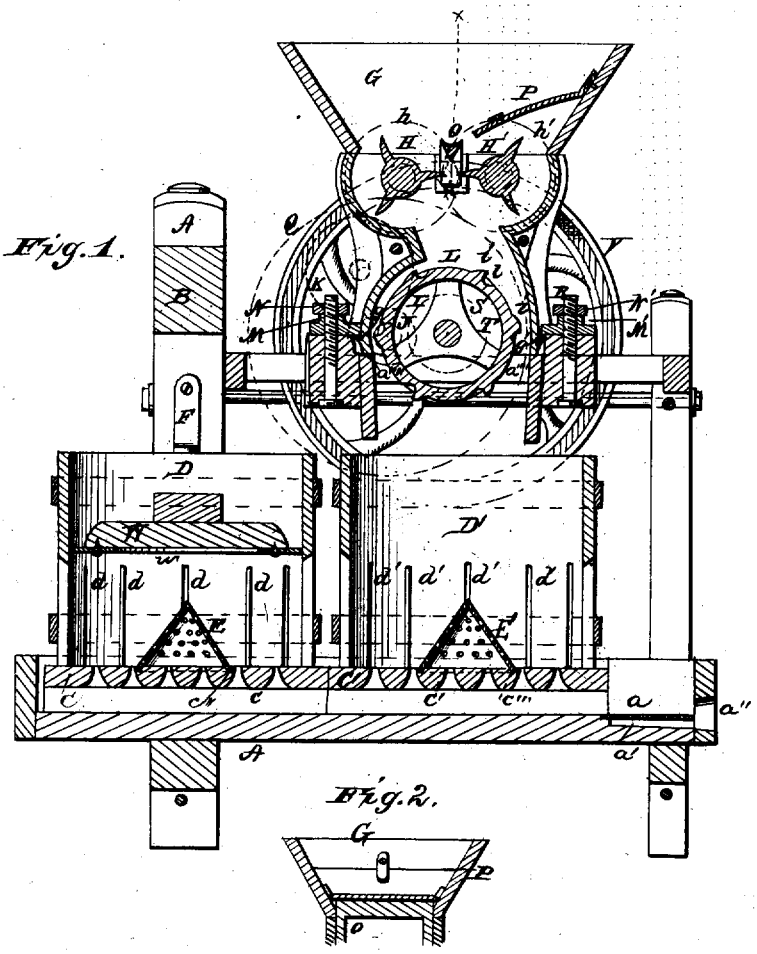
Figure 3:
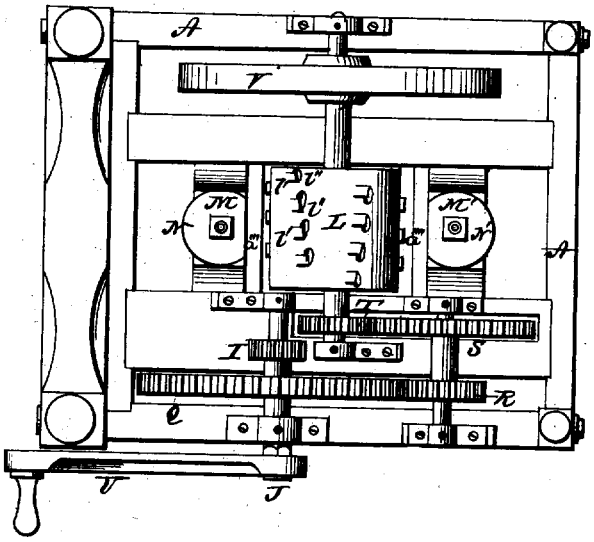
Figure 4:
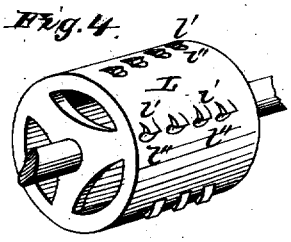

Figure 1 is a sectional elevation through entire mill, having dotted lines to represent the position of the driving mechanism. Fig. 2 is a section through the line *x x*, Fig. 1. Fig. 3 is a plan of the mill with hoppers removed. Fig. 4 is a perspective view of the crushing-cylinder, showing cutting-teeth and adjacent cavities.

A is the frame of a cider-mill intended to be operated by hand-power. B is the cross-head, in which is secured the nut to receive the threaded part of the press-screw. The bottom or trough of the press-frame is fitted at one end with a metallic strainer, *a*, resting over a cavity, $a^1$, and immediately in front of an escape-vent, $a^2$, the whole device acting to collect and drain the juices from the press. Resting upon this true bottom of the press are false bottoms C C′, composed of slotted boards secured to battens *c c′*, thus permitting an unobstructed flow of the juices from the press-cages which rest upon them to the vent $a^2$. As above mentioned, there are resting upon these false bottoms press-cages D D, formed of staves cut or bent to a circle, inclosed within metallic hoops, and having partial saw-cuts *d d′* from the bottoms up, which drain the juices from the exterior of the cage. The press-cages are made of broad staves, with the saw-cuts reaching about half-way up, while the upper half of the cage is solid clear around. These staves, being jointed together at the upper ends, admit of being bound firmly together by hoops, as shown, and thus prevent the shackling incident to separated staves riveted or otherwise fastened separately to the hoops. At the centers of the false bottoms, and resting in annular grooves *c″ c‴*, formed in the latter, are metallic perforated cones E E′, which drain the juices from the central part of the cage through the slotted bottoms to the escape-vent.

Secured to the frame A directly below the cross-head B are swinging latches F, (one only being shown in the drawing,) which are hung loosely, and, when in use, rest upon the top edges of the cages, so as to steady the same, and prevent any displacement during the process of pressing, but can be easily turned up when the cages are to be moved. The press-cages sit immediately between the posts to which the latches are hung. The frame of the press is so arranged that one cage will be under the grinding machinery while the other is under the press, thus rendering the machine continuous in its action.

G is the hopper, in which the fruit is placed, being funnel-shaped and of wood at the top, and formed of metal, with double concaves below, in which revolve the feed-rollers H H′, by virtue of gearing, with decreased motion, as is desirable for this purpose, communicated from pinion I on prime-motive shaft J, through wheel K, to the wheel *h* on first feed-roller shaft, which latter communicates it to the wheel *h′* on second roller-shaft. The hopper G, below the feed-rollers H H′, expands in concave shape around the rasping-cylinder L, to form the rasping-chamber, and rests upon the frame A at *a‴ a⁗*, and has lugs *g g′* formed upon it. In close proximity to the line of descent of the hopper when being placed in position are secured cam-washers M M′ upon bolts in the frame A, having blanks cut from the edges nearest to their centers, which must face the descending hopper, in order to allow the lugs *g g′* to pass, which otherwise they would not do.

The cams or cam-washers are eccentric-nuts, placed in front and rear of the lower part of the hopper, and which, by their shape, cause the hopper to approach or recede from the cylinder, thus modifying the quality of the feed, making it coarse or fine, while at the same time they fasten the hopper to the mill.

The cams may be swung around and over the lugs, and retained in position, so as to secure the hopper, by check-nuts N N′. These cams are so situated, as regards distance apart, that, if one presents its longest radius between its center and the side of the hopper, the other must, perforce, present its shortest radius when acting upon the lugs *g g′* to retain the hopper; and it is obvious that, by reversing the cams, the position of the hopper must change correspondingly, thus increasing or decreasing the space *l* between the revolving rasping-cylinder L and movable rasping-chamber, and the fruit ground will be correspondingly coarse or fine.

The feed-rollers are two in number, and each is composed of three blades upon a central axis or roller, which act in concert, and their shape enables them as they turn to gather in the apples and force them down upon the rasping-cylinder immediately below. They also hold up the apples from the cylinder until the mill is in motion.

The amount of fruit fed is decided partly by the extent of opening, which is regulated by means of the detachable slide O and plate P, which are both or singly removable, or used in position as required by the strength of the operator.

The slide O divides the upper part of the hopper in two parts, and it operates above the line passing through the axis of the rollers and between the circuits of the outer extremities of the blades, and cuts off the feed immediately between them. It can be lifted out, thus increasing the feed. The plate P covers over one feed-roller, thus diminishing the feed very much.

If the operator is desirous of working light, he retains both slide O and plate P in place. If he is desirous of increasing the amount of apples fed, he can remove the plate P, so that apples may pass in from both sides of the hopper. If he still desires to increase the feed of apples, he can remove the central slide, O, so that the apples can pass in from both sides and also from the center. The fruit, after being thus admitted, is crushed in the chamber by the rasping-cylinder L, having rows of teeth *l′* placed diagonally over the surface, as relating to its axis, with cavities *l″* formed in it at the front and one side of the rear cutting-edge of each tooth, which cavities serve to hold the pomace until the concave is passed, and afterward, by centrifugal action, to clear the teeth from pomace. The teeth of one row are placed directly in front of the spaces between the teeth of the succeeding row, and any two consecutive rows are diagonally opposed to each other across the axial line of the cylinder, as shown.

The cylinder receives accelerated motion from the multiplying gearing Q R S T, (shown in Fig. 3,) the wheel Q being keyed to the driving-shaft J, to which is secured a crank, U, for utilizing manual labor, and is kept in uniform velocity by fly-wheel V.

W is the press-cage follower, formed of a wooden disk, to loosely fit the inner periphery of the press-cage, while a metallic disk, *w*, of suitable diameter to fit accurately inside the cage, is secured to its under surface, so as to prevent the difficulty of either having a loose-fitting follower-head when simply a wooden one is used, or having the same an accurate fit when dry, and finding it to stick when damp and swelled.

Having thus fully described my invention, what I claim as new, and desire to secure by Letters Patent, is—

1. The crushing-cylinder L, formed with teeth *l′* and cavities *l″*, constructed and arranged substantially as and for the purpose specified.

2. In combination with the annular grooves *e″ e‴*, the conical perforated metallic strainers E E′, constructed and operating substantially as and for the purpose specified.

3. The swinging latches, in combination with the press-cages, for the purposes set forth.

4. The cam-washers M M′, in combination with the hopper, for the purposes herein set forth.

5. The detachable slide O and plate P, in combination with the hopper and feed-rollers, for the purposes set forth.

In testimony that I claim the foregoing I have hereunto set my hand and seal this 31st day of May, 1878.

JESSE BOWEN. [L. S.]

Witnesses:

ALEX. FINLEY,

CHARLES BAUMASTER, Jr.